US008826266B2

(12) United States Patent
Little (10) Patent No.: US 8,826,266 B2
(45) Date of Patent: Sep. 2, 2014

(54) UPDATES OF MESSAGE CONSUMERS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1699 days.

(21) Appl. No.: 11/998,669

(22) Filed: Nov. 29, 2007

(65) Prior Publication Data

US 2009/0144724 A1    Jun. 4, 2009

(51) Int. Cl.
  *G06F 9/44*        (2006.01)
(52) U.S. Cl.
  USPC ............................ 717/173; 717/168; 717/171
(58) Field of Classification Search
  None
  See application file for complete search history.

(56) References Cited

U.S. PATENT DOCUMENTS

| | | | | |
|---|---|---|---|---|
| 6,438,748 | B1 * | 8/2002 | Gard et al. | 717/168 |
| 6,560,604 | B1 * | 5/2003 | Fascenda | 1/1 |
| 7,080,078 | B1 | 7/2006 | Slaughter et al. | |
| 7,159,224 | B2 | 1/2007 | Sharma et al. | |
| 7,185,342 | B1 | 2/2007 | Carrer et al. | |
| 7,676,804 | B2 * | 3/2010 | Ferguson et al. | 717/173 |
| 7,761,533 | B2 * | 7/2010 | Angelov | 709/217 |
| 8,271,969 | B2 * | 9/2012 | Quin et al. | 717/170 |
| 2004/0133887 | A1 * | 7/2004 | Herle et al. | 717/171 |
| 2005/0050549 | A1 * | 3/2005 | Joseph et al. | 719/313 |
| 2005/0257214 | A1 * | 11/2005 | Moshir et al. | 717/171 |
| 2006/0101454 | A1 * | 5/2006 | Whitehead | 717/168 |
| 2006/0130054 | A1 * | 6/2006 | Bocking et al. | 717/173 |
| 2007/0277169 | A1 * | 11/2007 | Rao et al. | 717/173 |
| 2008/0114839 | A1 * | 5/2008 | Borgendale | 709/206 |
| 2008/0253391 | A1 * | 10/2008 | Krits et al. | 370/466 |
| 2009/0044182 | A1 * | 2/2009 | Quin et al. | 717/168 |
| 2009/0138867 | A1 * | 5/2009 | Bambach et al. | 717/171 |

OTHER PUBLICATIONS

Huifang et al. A Flexible Hybrid Communication Model Based Messaging Middleware. Proceedings Autonomous Decentralized Systems, Apr. 2005, pp. 289-294, Retrieved on [Apr. 18, 2014] Retrieved from the Internet:URL<http://ieeexplore.ieee.org/xpls/abs_all.jsp?arnumber=1452069>.*
Sahai et al. Message tracking in SOAP-based Web services, Network Operations and Management Symposium, 2002, pp. 33-47, Retrieved on [Apr. 18, 2014] Retrieved from the Internet: URL<http://ieeexplore.ieee.org/xpls/abs_all.jsp?arnumber=1015542>.*
King, Erik, "Perpetual Enterprise Management Service (PEMS) for Next Generation SOA-based Command & Control Systems", Jun. 2005, 26 pages.
King, Erik, "Perpetual Enterprise Management Service (PEMS) for C2 SOA Deployments", Jun. 14, 2005, 23 pages.
"JBossESB Requirements and Architecture, Version: 0.3," May 2, 2006, pp. 1-12.
Oasis, "Web Services Context Specification (WS-Context)," OASIS Committee draft version 0.8, Version created Nov. 3, 2004, Editors, Mark Little, et al., Copyright © 2004 The Organization for the Advancement of Structured Information Standards [Appendix A], pp. 1-23.

(Continued)

*Primary Examiner* — Thuy Dao
*Assistant Examiner* — Cheneca Smith
(74) *Attorney, Agent, or Firm* — Lowenstein Sandler LLP (57) ABSTRACT

A message is received at a message consumer, the received message having a component dependency identification that indicates a version of a software component that is necessary to process the message. The version of the software component is automatically downloaded if the message consumer does not already include the version of the software component. The version of the software component is then used to process the received message.

16 Claims, 8 Drawing Sheets

(56) References Cited

OTHER PUBLICATIONS

Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jimsxml.html, Mar. 14, 2007, pp. 1-13.

"Why ESB and SOA?" Version 0.3, Date: Jan. 27, 2006, pp. 1-7.

* cited by examiner

UPDATES OF MESSAGE CONSUMERS

TECHNICAL FIELD

Embodiments of the present invention relate to distributed computing, and more specifically to dynamically updating message consumers in response to received messages in a distributed computing system.

BACKGROUND

In conventional distributed computing systems, received messages are added to a queue of a message consumer, and are automatically executed once they reach the head of the queue. There is an implicit assumption in conventional distributed computing systems that versions of software components included in the message consumer correspond to versions of software components included in a message producer. If the versions of software at the message consumer do not correspond to those of the message producer, the message consumer may be unable to process the message.

In some conventional distributed computing systems, the message consumer may generate an error message if the message cannot be executed. The error message may alert an administrator that the message consumer needs to be updated. The administrator must then manually update the message consumer to enable it to process subsequent messages. Conventional distributed computing systems do not include a mechanism for dynamically updating the message consumer prior to processing the message.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for dynamically updating a message consumer in a distributed computing system. In one embodiment, a message is received at a message consumer. The received message may include a component dependency identification that indicates a version of a software component that is necessary to process the message. The version of the software component is automatically downloaded if the message consumer does not already include the version of the software component. The version of the software component may be downloaded by a rules engine, an update service that is native to an operating system on which the message consumer runs, or some other updater. The version of the software component is then automatically installed on the message consumer. Once the version of the software component is installed, the received message is processed.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "associating", "transmitting", "generating", "receiving", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
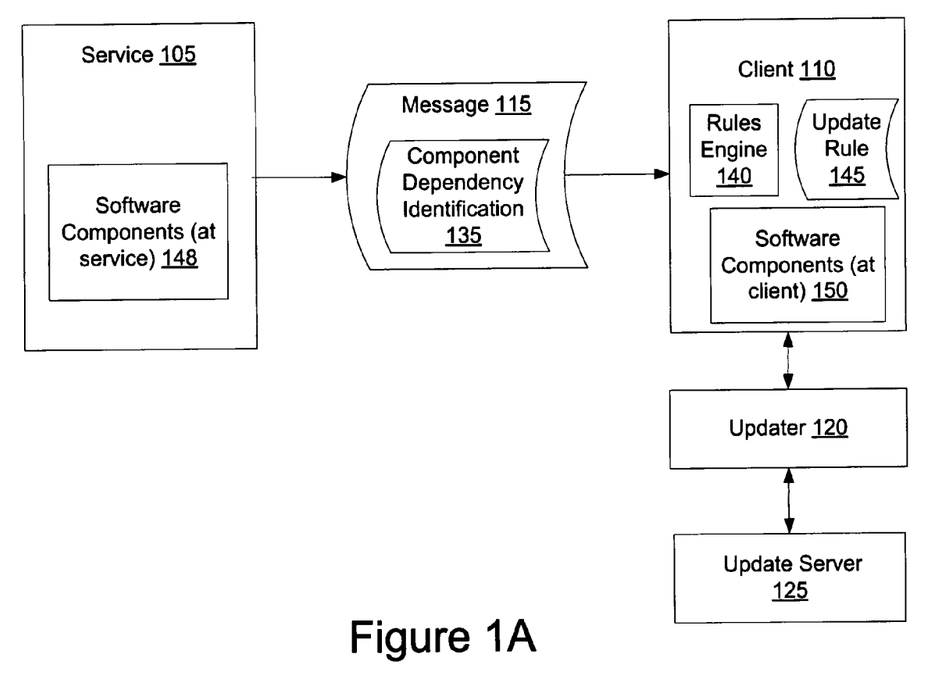
FIG. 1A illustrates a data flow diagram showing a message flowing through a distributed computing system, in accordance with one embodiment of the present invention.
Figure 2:
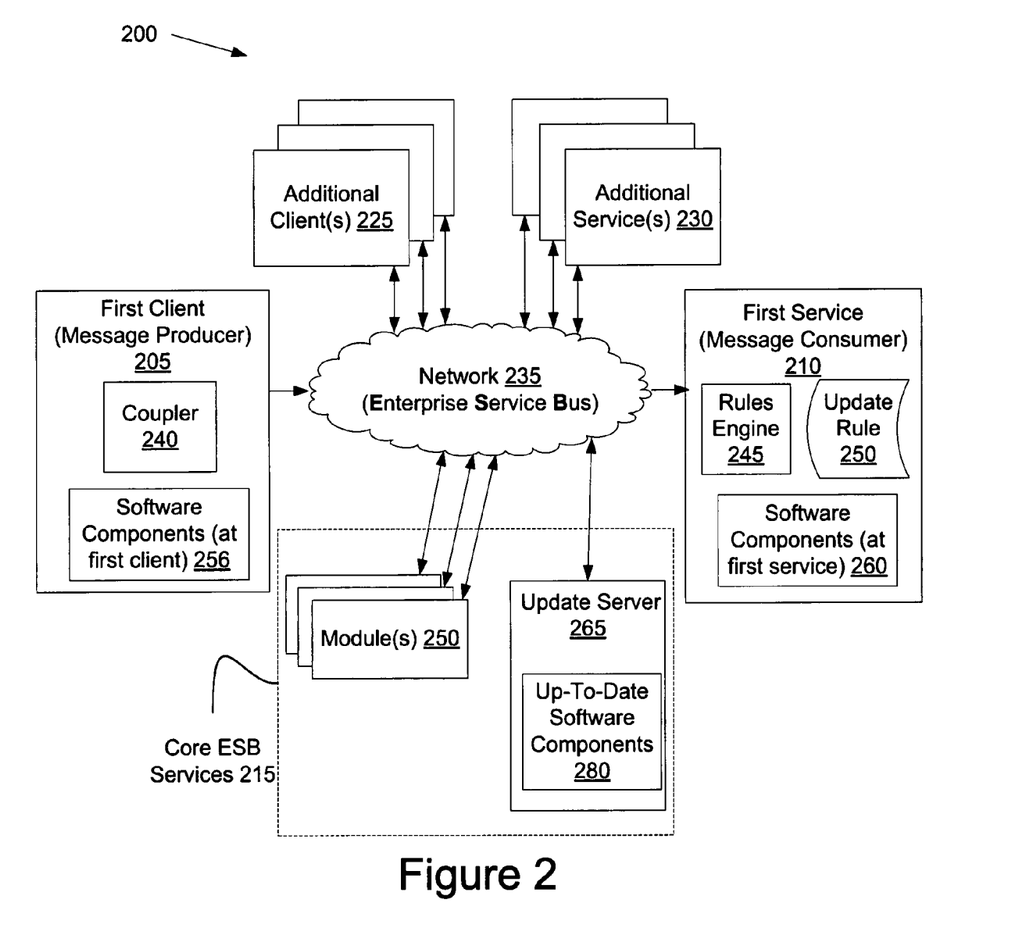
FIG. 2 illustrates an exemplary distributed computing system, in which embodiments of the present invention may operate.

FIG. 1A illustrates a data flow diagram showing a message flowing through a distributed computing system, in accordance with one embodiment of the present invention. In one embodiment, the distributed computing system is implemented as a database management system. In other embodiments, the distributed computing system is implemented as a service oriented architecture (SOA) and/or as an enterprise service bus (ESB). An exemplary distributed computing system is illustrated in FIG. 2 below.

Returning to FIG. 1A, a service 105 generates a message 115 and transmits it to a client 110 through the distributed computing system. Service 105 may be a discretely defined set of contiguous and autonomous functionality (e.g., business functionality, technical functionality, etc.). Service 105 may be resident on a personal computer (PC), server, router, etc. Service 105 may represent a process, activity or other resource that can be accessed and used by other services or clients within the distributed computing system. Service 105 may be independent of other services (not shown), and may be accessed without knowledge of its underlying platform implementation.

In one embodiment, service 105 includes multiple software components 148. Software components 148 may include, for example, specific message dispatchers (e.g., a security dispatcher, transaction dispatcher, etc.), parsers (e.g., XML parser, token parser, etc.), java virtual machines, transmission protocols, etc. Service 105 uses software components 148 to generate message 115.

In one embodiment, message 115 includes data that conveys information to, or initiates an event on, client 110. The message 115 may be generated for any of a myriad of purposes. For example, the message 115 may be generated to report a purchase of a good, to request contact information, to report a result of a remote process, initiate a remote process, etc.

Message 115 includes a message header, a message context, and/or a message body. The message header includes a unique message identifier and/or routing information (e.g., recipient, sender, message priority, etc.). The message header may be used to identify the message 115, and to route the message 115 to end points (recipients) intended by service 105, or to other end points determined by the distributed computing system. The message 115 may be directed to a specific endpoint (e.g., client 110). Alternatively, the message 115 may be posted to an intermediate location, which one or more endpoints may communicate with to receive the message 115.

The message context includes properties that support compatibility between service 105 and client 110. The message context may provide, for example, custom fields or filters, transactional information (e.g., to identify a distributed transaction or session associated with the message), security information (e.g., authorization information, authentication information, etc.), and so on.

The message body may include data to which a client 110 may respond (e.g., by initiating an event). The content and configuration (layout) of the message body may determine a message type. Examples of message types include text messages, map messages, bytes messages, stream messages and object messages. Other message types are also possible. In one embodiment, the message body is formatted using an extensible markup language (XML). Use of XML allows flexible information formats to be implemented. Other flexible information formats, such as standard generalized markup language (SGML) may also be used for the message body.

Message 115, when generated by specific versions of software components 148, in some cases can only be processed by corresponding versions of software components 150 at client 110. For example, the message 115 may only be processed by software components 150 that are equivalent or newer than versions of software components 148 used to generate the message 115. Therefore, message 115 includes multiple component dependencies, each of which represents specific software components 148 and/or versions of software components 148 that the message 115 is dependant upon (e.g., that are necessary to process the message 115).

In one embodiment, message 115 includes a component dependency identification 135 that indicates each of the component dependencies for the message 115. The component dependency identification 135 may include a list of versions of software components 150 necessary to receive, process, read and/or have a guaranteed quality of service for the message 115. Alternatively, the component dependency identification 135 may include a component dependency table, or other data structure that conveys such component dependency information. For example, the component dependency identification 135 may indicate that the message 115 must be processed using version 2.1 or higher of a Java Virtual Machine and version 3.0 of a specified security protocol. In one embodiment, the component dependency identification 135 includes an address of one or more servers (e.g., update server 125) from which versions of software components can be obtained.

Client 110 may be, for example, a personal computer (PC), palm-sized computing device, personal digital assistant (PDA), etc. Client 110 may also be an application run on a PC, server, database, etc. In a service oriented environment (SOA), client 110 includes an application that accesses services (e.g., service 105). Client 110 may be a fat client (client that performs local processing and data storage), a thin client (client that performs minimal or no local processing and minimal to no data storage), or a hybrid client (client that performs local processing but little to no data storage).

Client 110 includes multiple software components 150. Such software components 150 may include, for example, dispatchers (e.g., security dispatcher, transaction dispatcher, encryption dispatcher, etc.), java virtual machines, etc. In one embodiment, software components 150 at the client 150 must be compatible with software components 148 at service 105 in order for client 110 to process message 115.

In one embodiment, client 110 includes a rules engine 140 and an update rule 145. The rules engine 140 is a logic component that processes rules to produce outcomes. The rules engine 140 may match facts, data and rules, and infer conclusions which may result in actions or events of, for example, the client 110. In one embodiment, the rules engine 140 matches the facts, data and rules using a Rete Algorithm. Alternatively, the rules engine 140 may use a Linear Algorithm, Treat Algorithm, Leaps Algorithm, etc. Hybrid algorithms that use combinations of, for example, the Leaps Algorithm and the Rete Algorithm, may also be used.

Client 110 receives the message 115, and executes update rule 145 using rules engine 140. Update rule 145 provides instructions on how and whether to process message 115, and on whether to update software components 150 before doing so. Such instructions are provided as conditional elements (e.g., and, or, not, exists, etc.), constraints (e.g., equal to, not equal to, greater than, contains, etc.) and consequences or actions (e.g., decrypt message, process next rule, etc.). In one embodiment, when executed, update rule 145 causes rules engine 140 to compare the component dependency identification 135 of message 115 to software components 150 of client 110. Alternatively, rules engine 140 may examine message 115 to deduce component dependencies if no component dependency identification 135 is included. If rules engine 140 determines that the component dependencies of the message 115 do not match current software components 150, it initiates an update of the software components 150. Once the software components 150 have been updated (e.g., updates have been installed), update rule 145 causes rule engine 140 to process message 115 (e.g., using software components 150), or to pass the message 115 on to software components 150 to do so.

In one embodiment, software components 150 are updated by invoking an updater 120 that is coupled with client 110. Updater 120 may be an update service that is native to an operating system or machine on which client 110 runs. Alternatively, updater 120 may be a stand alone application that operates on a machine on which client 110 operates. Updater 120 receives requests from client 110 (e.g., as initiated by rules engine 140) to update or download specific versions of one or more of the software components 150. Updater 120 then accesses an update server 125 to retrieve the requested updates or downloads. Once updates are obtained, updater 120 forwards them to client 110.

In another embodiment, rules engine 140 updates software components 150 without invoking updater 120. Update rule 145 may, for example, cause rules engine 140 to contact update server 125, and download specified versions of software components 150. In one embodiment, client 110 only permits versions of software components 150 to be downloaded from trusted sources. A trusted source is a source from which client 110 can download software with a reasonable certainty that no viruses or other malware will also be downloaded.

Update server 125 maintains up-to-date versions of many software components 148, 150. When requests for versions of software components 148, 150 are received, update server 125 transmits those requested versions of software components 148, 150 to the requestor and/or allows the requested versions of the software components to be downloaded. In one embodiment, update server 125 is trusted by client 110.

Figure 1B:
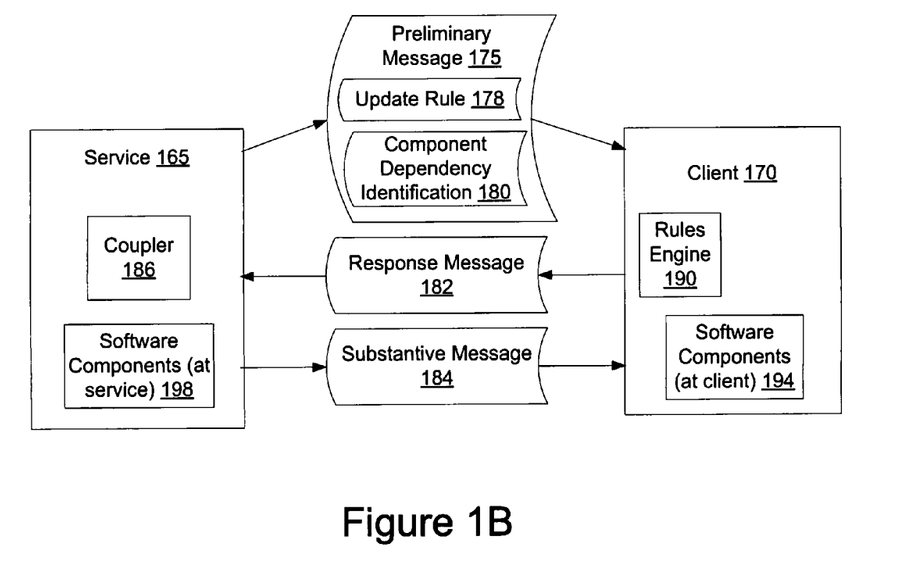
FIG. 1B illustrates a data flow diagram showing a message flowing through a distributed computing system, in accordance with another embodiment of the present invention.

FIG. 1B illustrates a data flow diagram showing a message flowing through a distributed computing system, in accordance with another embodiment of the present invention. A service 165 generates a preliminary message 175 and transmits it to a client 170 through the distributed computing system. In one embodiment, service 165 includes multiple software components 198 (e.g., security dispatcher, transaction dispatcher, java virtual machines, transmission protocols, etc), which are used to generate preliminary message 175. In a further embodiment, service 165 includes a coupler 186.

Coupler 186 associates rules and/or component dependency identifications with messages. In one embodiment, coupler 186 associates data (e.g., update rule 178 and/or component dependency identification 180) with preliminary message 175 by attaching the data to the message. Alternatively, associating data to preliminary message 175 may include placing the data in the body of the message. In one embodiment, coupler 186 associates a component dependency identification 180 with preliminary message 175. Alternatively, coupler 186 may associate an update rule 178, or both the component dependency identification 180 and the update rule 178, with preliminary message 175. In one embodiment, the component dependency identification 180 is incorporated into the update rule 178.

In one embodiment, preliminary message 175 is a message that is sent to client 170 in advance of a substantive message 184, in order to verify that client 170 includes necessary versions of software components 194 to process the substantive message 184. Preliminary message 175 may or may not include sufficient instructions to execute a transaction at client 170. Preliminary message 175 in one embodiment includes component dependency identification 180 and update rule 178. Alternatively, preliminary message 175 may include just the component dependency identification 180. In one embodiment, component dependency identification 180 does not identify component dependencies of preliminary message 175. Rather, component dependency identification 180 may identify component dependencies of a substantive message 184 that may be sent subsequent to preliminary message 175. In one embodiment, component dependency identification 180 identifies a communication protocol other than a communication protocol used to transmit preliminary message 175.

Client 170 includes multiple software components 194. Such software components 194 may include, for example, dispatchers (e.g., security dispatcher, transaction dispatcher, encryption dispatcher, etc.), java virtual machines, etc. In one embodiment, software components 194 at the client 170 must be compatible with software components 194 at service 165 in order for client 170 to process substantive message 184.

In one embodiment, client 170 includes a rules engine 180. Client 170 receives the preliminary message 175, and executes update rule 178 using rules engine 180. If rules engine 180 determines that the component dependency identification 180 does not match current software components 194, it initiates an update of the software components 194. Once the software components 194 have been updated (e.g., updates have been installed), update rule 178 causes rule engine 180 to generate a response message 182, and send it to service 165. Response message 182 indicates whether client 170 includes versions of software components 194 (e.g., a necessary communication protocol) that were identified in component dependency identification 178.

Service 165 receives response message 182, and determines whether software components 194 are sufficient to process substantive message 184. If client 170 includes necessary software components 194, service 165 generates substantive message 184, and sends it to client 170. In one embodiment, the substantive message 184 is transmitted using a communication protocol identified in the component dependency identification 180. Client may execute substantive message 184 to initiate or continue a transaction.

FIG. 2 illustrates an exemplary distributed computing system 200, in which embodiments of the present invention may operate. In one embodiment, the distributed computing system 200 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 200 may include clients (e.g., first client 205 and additional clients 225) and services (e.g., first service 210, additional services 230 and core ESB services 215), connected via a network 235. Each of the clients 205 and 225 and services 210, 215, 230 may be both message producers and message consumers, as described below.

The network 235 may be a public network (e.g., Internet), a private network (e.g., Ethernet or a local area Network (LAN)), or a combination thereof. In one embodiment, the network 235 includes an enterprise service bus (ESB). An ESB is an event-driven and standards-based messaging engine that provides services for more complex architectures. The ESB provides an infrastructure that links together services 210, 215, 230 and clients 205 and 225 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In the illustrated embodiment, the first client 205 is a message producer. Alternatively, additional clients 225, first service 210, additional services 230 or core ESB services 215 may be message producers. A message producer is a client or service that generates a message. Messages include data that may convey information to, or initiate an event on, a message consumer (e.g., a service or client).

First client 205 includes a coupler 240 and software components 256. In one embodiment, coupler 140 associates component dependency identifications with messages before the messages are sent to message consumers. The component dependency identifications may indicate versions of software components 256 used to generate the message. Alternatively, coupler 240 may associate an update rule to a generated message, or both an update rule and a component dependency identification to a message.

In the illustrated embodiment, the first service 210 is a message consumer. Alternatively, first client 205, additional clients 225, core ESB services 215 or additional services 230 may be message consumers. A message consumer receives a message generated by a message producer, and sent to an address (e.g., service address or client address) of the message consumer. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc. In one embodiment, message consumers must have software components 260 that are compatible with software components 256 of a message producer that generated the message for the message to be processed. If software components 260 of first service 210 are not compatible with software components 256 of first client 205, the software components 260 must be updated before the message can be processed.

First service 210 includes a rules engine 245. When a message is received from first client 205, rules engine 245 processes one or more rules (e.g., an update rule) to determine whether software components 260 should be updated. If software components 260 of first service 210 are not compatible with software components 256 of first client 205, first service 210 updates the software components 260. Once the software components are updated, first service 210 processes the received message.

In one embodiment, the distributed computing system 200 includes an ESB that has a collection of core ESB services 215. The core ESB services 215 act on messages that flow through the ESB. Messages can also be directed towards any of the core ESB services 215 in the same manner as described above with reference to the first service 210 and additional services 230. Any of the core ESB services 215 may include one or more general purpose computing devices (e.g., personal computer or server) and/or special purpose computing devices configured to act on messages that flow between message producers (e.g., clients or services) and message consumers (e.g., clients or services) within the ESB.

The core ESB services 215 may include one or more modules 250, each of which may be a service of the ESB. Examples of modules 250 include modules that provide services for splitting a message into multiple messages, routing messages, combining multiple messages into a single message, transforming messages from a first format to a second format, applying rules to a message, storing copies of messages, etc. Each module 250 may provide a service to clients 205 and 225 and/or services 210 and 230 of the distributed computing system 200. In one embodiment, core ESB services 215 include an update server 265. Update server 265 maintains up-to-date versions of software components 280 used by clients 205, 225 and services 210, 230 of the ESB. Update server 265 transmits such up-to-date versions of software components 280 to clients 205, 225 or services 210, 230 upon request.

Figure 3:
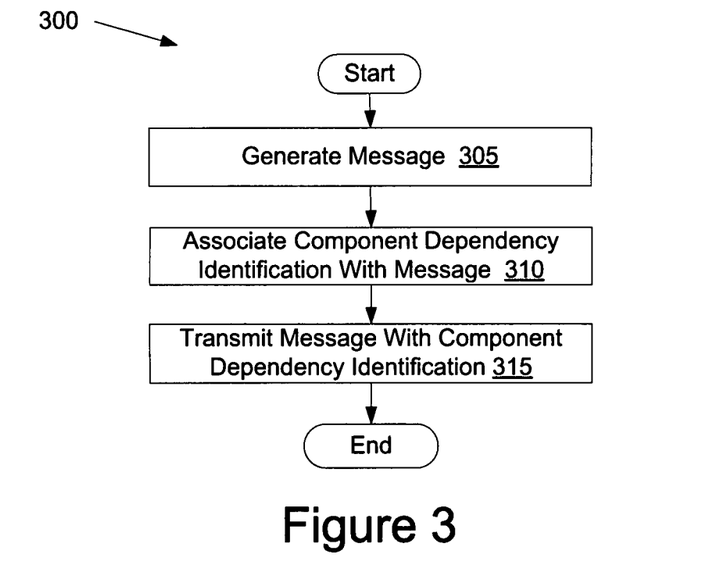
FIG. 3 illustrates a flow diagram of one embodiment for a method of facilitating processing of a message having a software component dependency.

FIG. 3 illustrates a flow diagram of one embodiment for a method 300 of facilitating processing of a message having a software component dependency. The method is performed by processing logic that comprises hardware (e.g., circuitry, dedicated logic, programmable logic, microcode, etc.), software (such as instructions run on a processing device), or a combination thereof. In one embodiment, method 300 is performed by service 105 of FIG. 1A. In an alternative embodiment, method 300 is performed by a service or client of distributed computing system 200 of FIG. 2.

Referring to FIG. 3, method 300 includes processing logic generating a message (block 305). The message is generated by a message producer (e.g., a client or service) using multiple software components. At block 310, a component dependency identification is associated with the message. The component dependency identification indicates versions of software components that are required to process the message, which may correspond to versions of software components used to generate the message. An update rule may also be associated with the message. The update rule provides instructions on whether and how to update software components of a message consumer. At block 315, the message is transmitted with the component dependency identification to a message consumer.

Figure 4:
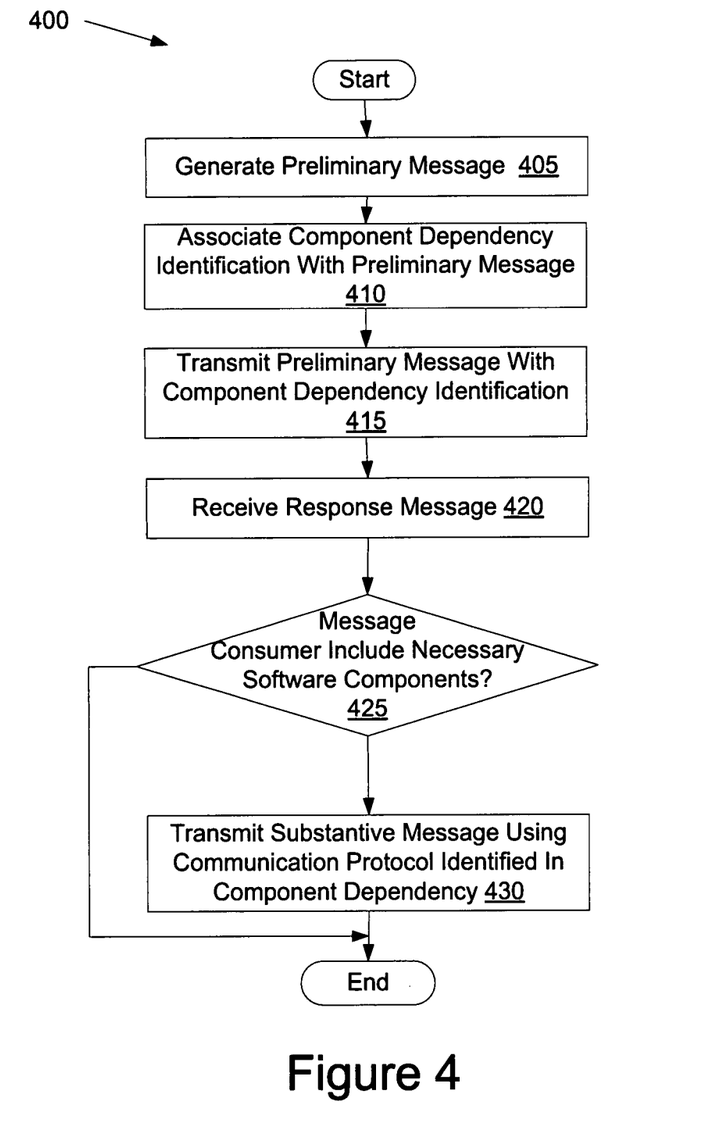
FIG. 4 illustrates a flow diagram of another embodiment for a method of facilitating processing of a message having a software component dependency.

FIG. 4 illustrates a flow diagram of another embodiment for a method 400 of facilitating processing of a message having a software component dependency. The method is performed by processing logic that comprises hardware (e.g., circuitry, dedicated logic, programmable logic, microcode, etc.), software (such as instructions run on a processing device), or a combination thereof. In one embodiment, method 400 is performed by service 105 of FIG. 1A. In an alternative embodiment, method 400 is performed by a service or client of distributed computing system 200 of FIG. 2.

Referring to FIG. 4, method 400 includes processing logic generating a preliminary message (block 405). The preliminary message is a message that is sent to a message consumer in advance of a substantive message, in order to verify that the message consumer includes necessary versions of software components to process the substantive message. At block 410, a component dependency identification is associated with the preliminary message. The component dependency identification indicates versions of software components that are required to process a substantive message that may be sent to a message consumer subsequent to the preliminary message. In one embodiment, one of the software components included in the component dependency identification is a specific communication protocol. The included communication protocol may be different from a communication protocol used to transmit the preliminary message. An update rule may also be associated with the preliminary message. At block 415, the preliminary message is transmitted with the component dependency identification to a message consumer.

At block 420, a response message is received from the message consumer. The response message indicates whether the message consumer includes necessary versions of software components to process a substantive message.

At block 425, processing logic determines whether the message consumer includes necessary versions of software components. Such information can be included in the response message. If the message consumer includes the necessary software components, the method proceeds to block 430. If the message does not include the necessary software components, the method ends.

At block 430, the substantive message is generated and transmitted to the message consumer. In one embodiment, the substantive message is transmitted to the message consumer using a communication protocol that was included in the component dependency identification. In one embodiment, the substantive message and the preliminary message are generated concurrently, and the substantive message is automatically transmitted to the message consumer upon receiving the response message.

Figure 5:
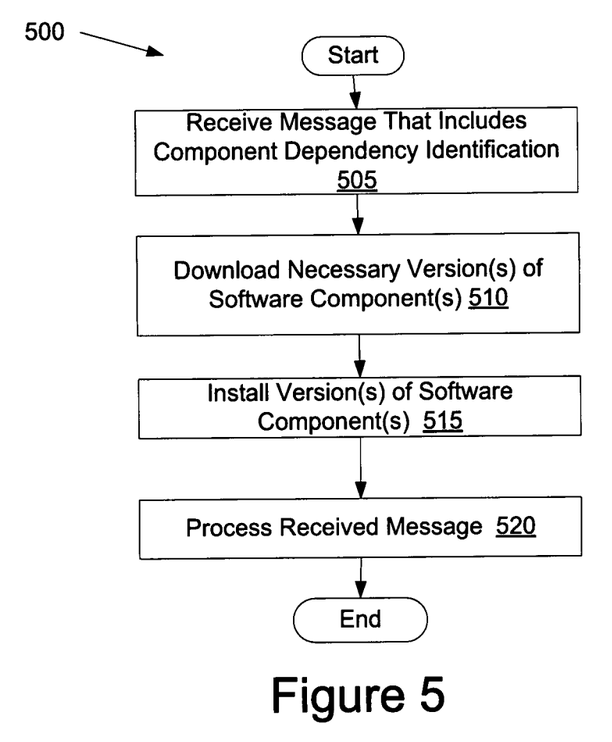
FIG. 5 illustrates a flow diagram of one embodiment for a method of dynamically updating software components of a message consumer.

FIG. 5 illustrates a flow diagram of one embodiment for a method 500 of dynamically updating software components of a message consumer. The method is performed by processing logic that comprises hardware (e.g., circuitry, dedicated logic, programmable logic, microcode, etc.), software (such as instructions run on a processing device), or a combination thereof. In one embodiment, method 500 is performed by client 110 of FIG. 1A or client 170 of FIG. 1B. In an alternative embodiment, method 500 is performed by a service or client of distributed computing system 200 of FIG. 2. Method 500 may be performed without any user interaction.

Referring to FIG. 5, method 500 includes processing logic receiving a message that includes one or more component dependencies (block 505). The component dependencies represent versions of software components that are necessary to process the message. The message may be received by a client or service of a distributed computing system. The component dependencies may be identified in a component dependency identification associated with (e.g., attached to) the message.

At block 510, processing logic downloads a version of a software component or software components that are necessary to process the message. The software components may be downloaded using an update service that is native to (or that runs on) an operating system or machine on which the processing logic operates. Alternatively, the software components may be downloaded by a rules engine. At block 515, the versions of the software components are installed. At block 520, the message is processed. The method then ends.

Figure 6:
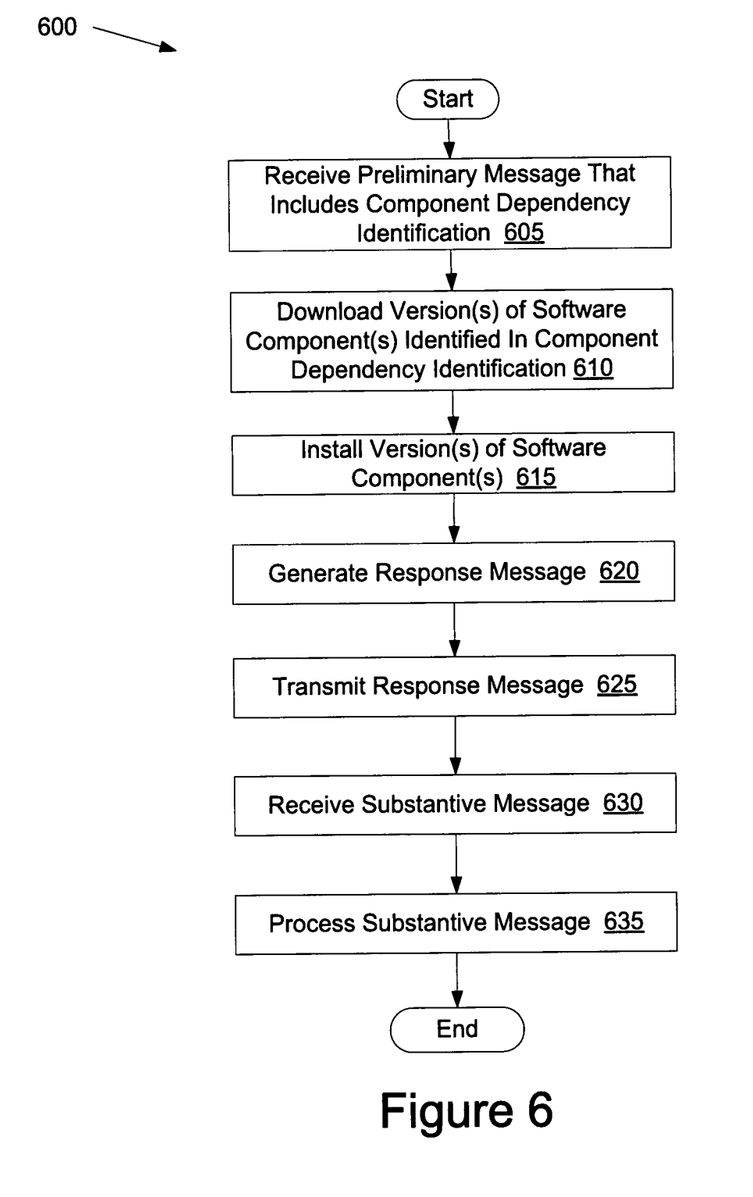
FIG. 6 illustrates a flow diagram of another embodiment for a method of dynamically updating software components of a message consumer.

FIG. 6 illustrates a flow diagram of another embodiment for a method 600 of dynamically updating software components of a message consumer. The method is performed by processing logic that comprises hardware (e.g., circuitry, dedicated logic, programmable logic, microcode, etc.), software (such as instructions run on a processing device), or a combination thereof. In one embodiment, method 600 is performed by client 110 of FIG. 1A or client 170 of FIG. 1B. In an alternative embodiment, method 600 is performed by a service or client of distributed computing system 200 of FIG. 2. Method 600 may be performed without any user interaction.

Referring to FIG. 6, method 600 includes processing logic receiving a preliminary message that includes a component dependency identification (block 605). The component dependency identification identifies versions of software components that are necessary to process the preliminary message and/or a substantive message that may be transmitted subsequent to the preliminary message. In one embodiment, the component dependency identification includes a communication protocol that will be used to transmit the substantive message.

At block 610, processing logic downloads a version of a software component or software components that are identified in the component dependency identification. At block 615, the versions of the software components are installed.

At block 620, a response message is generated. The response message indicates that processing logic is capable of processing messages generated using the versions of the software components indicated in the component dependency identification. At block 625, the response message is transmitted to a message producer that sent the preliminary message. In one embodiment, the response message is transmitted using a communication protocol included in the component dependency identification. Alternatively, the response message may be transmitted using a communication protocol used to transfer the preliminary message.

At block 630, a substantive message is received. The substantive message may have been sent using a communication protocol identified in the component dependency identification. At block 635, the substantive message is processed.

Figure 7:
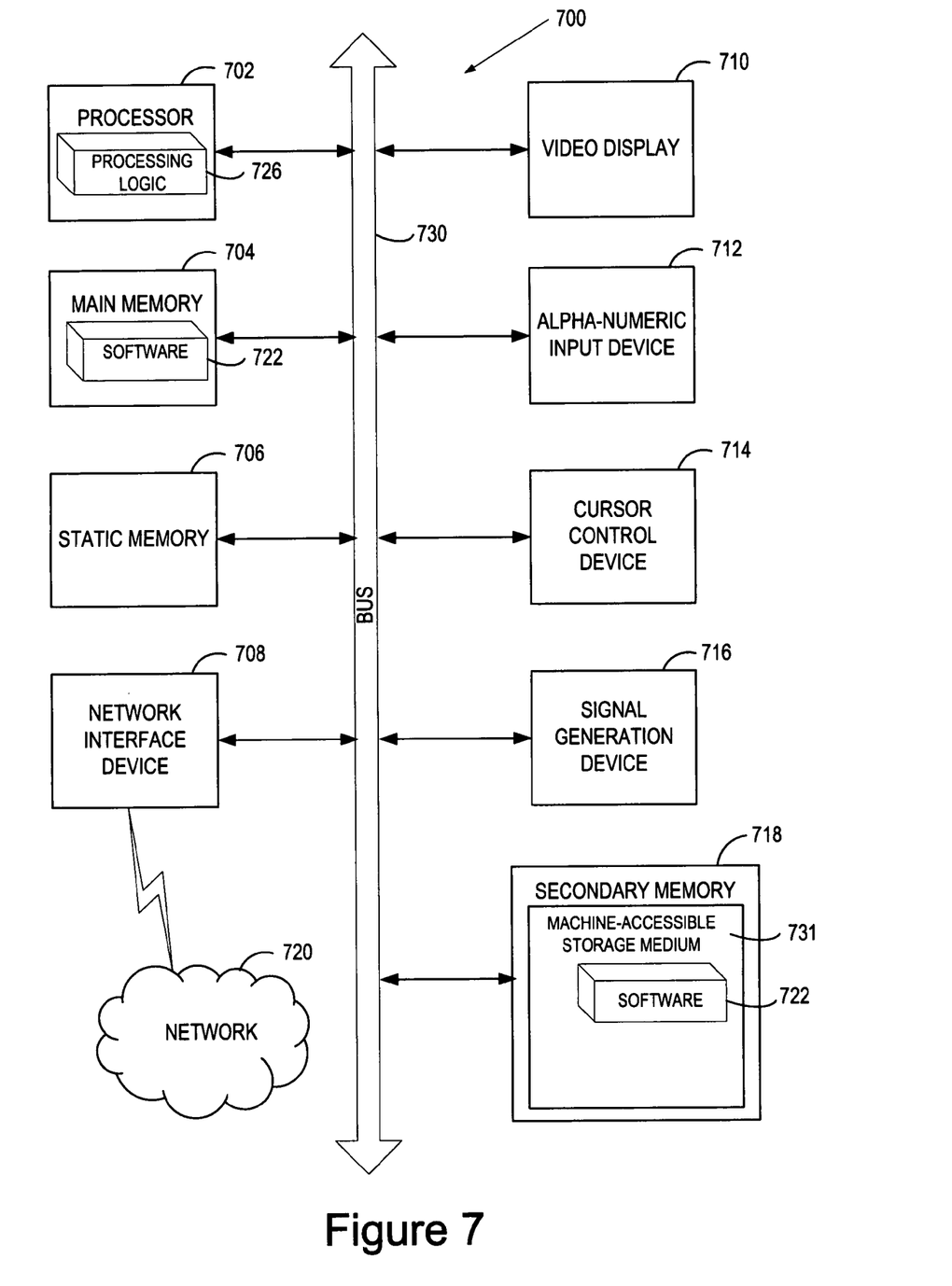
FIG. 7 illustrates a block diagram of an exemplary computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

The machine-readable storage medium 731 may also be used to store, for example, the coupler 186, software components 194, 198 and/or rules engine 190 of FIG. 1, and/or a software library containing methods that call the coupler 186, rules engine 190 and/or software components 194, 198. While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   generating a message by a processor;
   associating, by the processor, a component dependency identification of a software component with the message, wherein the component dependency identification, when accessed by a message consumer, causes the message consumer to install a version of the software component identified by the component dependency identification before processing the message, wherein the component dependency identification identifies a communication protocol;
   transmitting the message with the associated component dependency identification to the message consumer, the component dependency identification to identify a location from which the version of the software component can be obtained;
   receiving a response from the message consumer, the response to indicate that the message consumer has installed the communication protocol;
   generating, by the processor, an additional message; and
   sending the additional message to the message consumer using the communication protocol.

2. The method of claim 1, wherein the message is a preliminary message to verify that the message consumer comprises a version of the software component that is necessary to process the additional message.

3. The method of claim 2, wherein the preliminary message does not comprise sufficient instructions to execute a transaction at the message consumer.

4. The method of claim 2 further comprising transmitting the additional message to the message consumer after the version of the software component identified by the component dependency identification is installed in the message consumer.

5. A method, comprising:
   receiving a message at a processor executing a message consumer, the received message comprising a component dependency identification of a software component to indicate a version of the software component that is necessary to process the message, the component dependency identification to identify a location from which the version of the software component can be obtained, wherein the component dependency identification identifies a communication protocol;
   downloading, by the processor, the version of the software component in response to determining that the message consumer does not already comprise the version of the software component;
   installing the version of the software component;
   generating a response, the response to indicate that the message consumer comprises the communication protocol;
   sending the response to a message producer;
   receiving an additional message from the message producer via the communication protocol; and
   processing the additional message.

6. The method of claim 5, wherein downloading the version of the software component comprises:
accessing an update service that is native to an operating system on which the message consumer runs;
identifying the version of the software component to the update service; and
receiving the version of the software component from the update service once the update service acquires the version of the software component.

7. The method of claim 5, wherein the message consumer downloads the version of the software component from a trusted update server.

8. The method of claim 5, wherein downloading the version of the software component comprises:
executing an update rule by a rule engine located at the message consumer; and
downloading the version of the software component from an update server identified in the update rule.

9. The method of claim 5, wherein the message is a preliminary message to verify that the message consumer includes a version of the software component that is necessary to process the additional message.

10. The method of claim 9, wherein the preliminary message does not comprise sufficient instructions to execute a transaction at the message consumer.

11. A non-transitory computer-readable storage medium comprising instructions that, when executed by a processor, cause the processor to perform operations comprising:
generating a message by the processor;
associating, by the processor, a component dependency identification of a software component with the message, wherein the component dependency identification, when accessed by a message consumer, causes the message consumer to install a version of the software component identified by the component dependency identification before processing the message, wherein the component dependency identification identifies a communication protocol;
transmitting the message with the associated component dependency identification to the message consumer, the component dependency identification to identify a location from which the version of the software component can be obtained;
receiving a response from the message consumer, the response to indicate that the message consumer has installed the communication protocol;
generating, by the processor, an additional message; and
sending the additional message to the message consumer using the communication protocol.

12. A non-transitory computer-readable storage medium comprising instructions that, when executed by a processor, cause the processor to perform operations comprising:
receiving a message at a message consumer running on the processor, the received message comprising a component dependency identification of a software component to indicate a version of the software component that is necessary to process the message, the component dependency identification to identify a location from which the version of the software component can be obtained, wherein the component dependency identification identifies a communication protocol;
downloading the version of the software component by the processor in response to determining that the message consumer does not already comprise the version of the software component;
installing the version of the software component;
generating a response, the response to indicate that the message consumer comprises the communication protocol;
sending the response to a message producer;
receiving an additional message from the message producer via the communication protocol; and
processing the additional message.

13. The non-transitory computer-readable storage medium of claim 12, wherein downloading the version of the software component comprises:
accessing an update service that is native to an operating system on which the message consumer runs;
identifying the version of the software component to the update service; and
receiving the version of the software component from the update service once the update service acquires the version of the software component.

14. A distributed computing system, comprising:
a first computing device comprising a memory and a processor coupled to the memory, the processor to:
receive a message from a second computing device via a network, the received message comprising a component dependency identification of a software component to indicate a version of the software component that is necessary to process the message, the component dependency identification to identify a location from which the version of the software component can be obtained, wherein the component dependency identification identifies a communication protocol; and
download the version of the software component and install the version of the software component on the message consumer in response to determining that the message consumer does not already comprise the version of the software component;
generate a response to indicate that the first computing device supports the communication protocol, and to send the response to a message producer;
receiving an additional message from the second computing device via the communication protocol; and
process the additional message.

15. The distributed computing system of claim 14, further comprising:
the second computing device, to generate the message, associate the component dependency identification with the message, and transmit the message with the associated component dependency identification to the first computing device.

16. The distributed computing system of claim 15, the distributed computing system further comprising:
the second computing device to receive the response, generate an additional message, and send the additional message via the communication protocol.

* * * * *